ic Patent Number: 5,374,688

Date of Patent: Dec. 20, 1994

United States Patent [19]
Besecke et al.

[54] POLY(METH)ACRYLAMIDES

[75] Inventors: Siegmund Besecke, Hameln; Andreas Deckers, Ludwigshafen; Wolfgang Loth, Bad Durkheim; Harald Lauke, Mannheim, all of Germany

[73] Assignee: BASF Aktiengesellschaft, Ludwigshafen, Germany

[21] Appl. No.: 994,634

[22] Filed: Dec. 21, 1992

[30] Foreign Application Priority Data

Dec. 21, 1991 [DE] Germany .................. 4142575

[51] Int. Cl.$^5$ .................................................. C08F 8/32
[52] U.S. Cl. ........................ 525/330.5; 525/329.9; 525/378; 525/379
[58] Field of Search ........................... 525/330.5

[56] References Cited

U.S. PATENT DOCUMENTS 2,146,209   2/1939   Graves et al. ................ 260/2

FOREIGN PATENT DOCUMENTS 0216505   4/1987   European Pat. Off. .
0234726   9/1987   European Pat. Off. .
0318197   5/1989   European Pat. Off. .
 366933   5/1990   European Pat. Off. .
0376749   7/1990   European Pat. Off. .
91/09886  7/1991   WIPO .

OTHER PUBLICATIONS

Patent Abstracts of Japan, vol. 10, No. 71 (C-334), Mar. 20, 1986.

*Primary Examiner*—Bernard Lipman
*Attorney, Agent, or Firm*—Keil & Weinkauf

[57] ABSTRACT

A polymer comprising essentially units of formula I

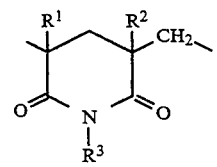

where $R^1$ and $R^2$ are each hydrogen or methyl, and
$R^3$ is $C_4$–$C_{18}$-alkyl, $C_5$–$C_8$-cycloalkyl, $C_6$–$C_{10}$-aryl or $C_6$–$C_{10}$-aryl-$C_1$–$C_4$-alkyl, each of which except for the $C_4$–$C_{18}$-alkyl may be monosubstituted, disubstituted or trisubstituted by radicals selected from the group consisting of $C_1$–$C_4$-alkyl, $C_1$–$C_4$-alkoxy and halogen, and having a carboxyl and anhydride group content of equal to or less than 0.40 equivalent per kilogram of polymer and an inherent color (measured as yellowness index) of equal to or less than 2.0, is obtainable by reacting a polymer based on $C_1$–$C_{20}$-alkyl esters of (meth)acrylic acid with a primary amine of the general formula II $$R^3NH_2 \qquad II$$

by removing the alcohol that forms during the reaction from the reaction mixture.

6 Claims, No Drawings

POLY(METH)ACRYLAMIDES

The present invention relates to a polymer comprising essentially units of formula I

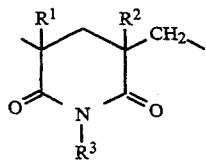

where
R$^1$ and R$^2$ are each hydrogen or methyl, and
R$^3$ is C$_4$-C$_{18}$-alkyl, C$_5$-C$_8$-cycloalkyl, C$_6$-C$_{10}$-aryl or C$_6$-C$_{10}$-aryl-C$_1$-C$_4$-alkyl, each of which except for the C$_4$-C$_{18}$-alkyl may be monosubstituted, disubstituted or trisubstituted by radicals selected from the group consisting of C$_1$-C$_4$-alkyl, C$_1$-C$_4$-alkoxy and halogen, and having a carboxyl and anhydride group content of equal to or less than 0.40 equivalent per kilogram of polymer and an inherent color (measured as yellowness index) of equal to or less than 2.0, obtainable by reacting a polymer based on C$_1$-C$_{20}$-alkyl esters of (meth)acrylic acid with a primary amine of the general formula II $$R^3NH_2 \qquad \text{II}$$

by removing the alcohol that forms during the reaction from the reaction mixture.

The present invention further relates to a process for preparing these polymers, to their use for preparing thermoplastic moldings and to moldings from these polymers.

Polymers based on C$_1$-C$_{20}$-alkyl esters of (meth)acrylic acid, the most common representatives of which are methyl methacrylate and methyl acrylate, are notable for excellent transparence and weathering stability. For these reasons polymethyl methacrylates (PMMAs) are used for example for manufacturing optically demanding parts such as lenses and for lamp coverings.

However, there are a number of uses for which such acrylate molding materials are insufficiently heat distortion resistant. One of the possible solutions is to raise the glass transition temperature by polymer-analogous reaction of, for example, PMMA with primary amines (imidation) to form cyclic imide structures (see Equation 1):

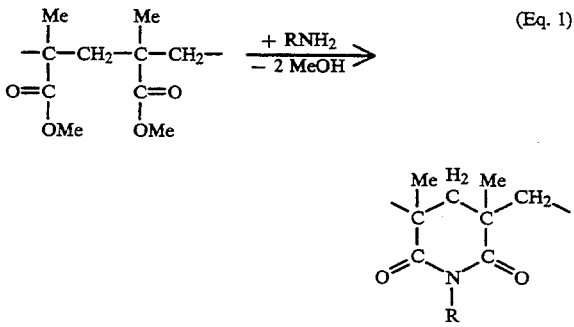

The imidation of PMMA in aqueous medium is known (see for example EP-A-376,749, page 6, lines 21-26) to lead, owing to the free carboxyl groups present in the end product, to a reduced flowability of the polymer and to an increased water regain, to greater proneness to stress crack corrosion and to a reduction in the weathering resistance.

The imidation of PMMA in an anhydrous medium is described for example in US-Pat. No.-2,146,209, where the reaction is carried out in solvents such as biphenyl and diethylene glycol. In addition to involving the use of solvents that are toxic (biphenyl) and difficult to recover because of their high boiling points, this process gives nonuniformly imidide products which show reduced transparency and have an inherent yellow color.

EP-B-234,726 describes a process for reacting methacrylic polymers with anhydrous amines in the presence of solvent mixtures (aromatic/alcohol) at up to 350° C. Under these conditions, however, some of the primary amine is alkylated by the alcohol with the elimination of water. The freed water of reaction then in turn hydrolyzes carboxylate groups and thus causes the acid number to increase. According to EP-A-318,197, a further disadvantage is that the alkylated amine is no longer available for imidation. On the contrary, it catalyzes the formation of anhydride structures, which in turn are readily hydrolyzable. Moreover, the loss of primary amine reduces the selectivity and economy of the process.

The position is similar with the process described in US-Pat. No.-4,246,374, wherein PMMA is imidated on an extruder in the absence of solvent. Here too the high reaction temperature results in the formation of water, which leads to partially hydrolyzed polymers having acid numbers of about 1 equivalent per kilogram of polymer and also to reduced transparence. A further disadvantage are by-products such as ethers and di- and trialkylamines.

Processes for reducing the acid number of polymethacrylimides are likewise known. For instance, EP-A-216,505 describes the back esterification of free carboxyl groups with alkylating agents such as trimethyl orthoformate. Here the disadvantage is the expense in terms of time and material associated with a 2-stage (extruder) process.

It is an object of the present invention to provide poly(meth)acrylimides that have a reduced acid number and an improved yellowness index.

We have found that this object is achieved by the polymers defined at the beginning.

We have also found a single-stage process for preparing these polymers, a use for them in preparing moldings, and moldings that are obtainable from these polymers.

For the purposes of the present invention, polymers based on C$_1$-C$_{20}$-alkyl esters of (meth)acrylic acid include both homopolymers and copolymers, which copolymers may additionally contain other ethylenically unsaturated comonomers.

The preferred C$_1$-C$_{20}$-alkyl methacrylates are the C$_1$-C$_4$-alkyl esters such as methyl methacrylate (MMA), ethyl methacrylate, propyl methacrylate, n-butyl methacrylate, isobutyl methacrylate and tert-butyl methacrylate, of which methyl methacrylate is particularly preferred, and also mixtures thereof.

Preferred C$_1$-C$_{20}$-alkyl acrylates are the C$_1$-C$_4$-alkyl esters such as methyl acrylate (MA), ethyl acrylate, propyl acrylate, n-butyl acrylate, isobutyl acrylate and tert-butyl acrylate, of which methyl acrylate is particularly preferred, and also mixtures thereof.

Suitable ethylenically unsaturated comonomers are acrylic acid, methacrylic acid, maleic acid derivatives such as the anhydride, imides and $C_1$–$C_{10}$-alkyl esters, itaconic acid derivatives such as imides and $C_1$–$C_{10}$-alkyl esters, acrylonitrile, methacrylonitrile, styrene, α-methylstyrene, ethylene, propylene, butadiene and also mixtures thereof.

The polymers can be prepared in a single or multiple stage process, although in the case of a multiple stage polymerization at least the outer stage must contain groups that can be imidated.

In general, the polymers comprise more than 50, preferably more than 80, % by weight of $C_1$–$C_{20}$-alkyl esters of methacrylic acid and acrylic acid. Of particular advantage from observations to date are polymers comprising from 80 to 100% by weight of methyl methacrylate and from 0 to 20% by weight of methyl acrylate within a molecular weight range ($M_w$) of from 20,000 to 300,000 g/mol.

The primary amine used, $R^3NH_2$, is selected from the group consisting of $C_4$–$C_{18}$-alkylamine, $C_5$–$C_8$cycloalkylamine, $C_6$–$C_{10}$-arylamine and $C_6$–$C_{10}$-aryl-$C_1$–$C_4$-alkylamine, in which the cycloalkyl, aryl and arylalkyl moieties may be monosubstituted, disubstituted or trisubstituted by radicals selected from the group consisting of $C_1$–$C_4$-alkyl, $C_1$–$C_4$-alkoxy and halogen such as fluorine, chlorine or bromine.

Examples are n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, aniline, 2-, 3-, 4-methylaniline, 2-, 3-, 4-methoxyaniline, 2-, 3-, 4-chloroaniline, 2-, 3-, 4-bromoaniline, benzylamine, phenethylamine and phenylpropylamine, particularly preferably cyclohexylamine.

It is an essential requirement of the invention that the alcohol that is formed by the aminolysis of the ester groups be removed from the reaction mixture. This is particularly advantageously achievable by continuously distilling off the alcohol. For this it is advantageous to use for the imidation an amine that has a higher boiling point than the alcohol to be removed from the reaction mixture, so that no or only insignificant amounts of amine are removed at the same time.

In principle, it is also possible to use amines having the same or a lower boiling point than the alcohol to be distilled off, for example by separating the amine removed with the alcohol from the alcohol by further distillation and recirculating it into the reaction mixture. However, the version suggested here (boiling point of amine > boiling point of alcohol) is preferred because of the simpler reaction control management.

The reaction is in general carried out by heating a mixture of acrylate polymer and amine, preferably in a solvent, to the boil in the absence of oxygen and continuously removing the alcohol formed in the course of the reaction from the reaction mixture by distillation.

The amine can be present right at the start of the reaction as part of the initial charge or can be added for example continuously at the rate of its consumption.

The weight ratio of amine used to acrylate polymer is in general within the range from 1:1 to 400:1, preferably from 1:1 to 200:1.

The solvent used can be basically any aprotic polar solvent such as

N,N'-disubstituted cyclic or acyclic carboxamides such as dimethylformamide, diethylformamide, dimethylacetamide or diethylacetamide N-methyl-2-pyrrolidone, N-ethyl-2-pyrrolidone N,N,N',N'-tetrasubstituted cyclic or acyclic ureas such as tetramethylurea N-substituted cyclic or acyclic (poly)amines such as dicyclohexylmethylamine, dimethylcyclohexylamine, N,N,N',N'-tetramethylethylenediamine or N,N,N',N'-tetramethylhexamethylenediamine ethers such as ethylene glycol dimethyl ether and diethylene glycol dimethyl ether alkylene carbonates such as ethylene carbonate and propylene carbonate and other customary aprotic and polar solvents such as nitroalkanes such as nitromethane, dimethyl sulfoxide, diphenyl sulfoxide and sulfolane, of which N-methylpyrrolidone is preferred.

The weight ratio of solvent used to polymer is in general within the range from 1:1 to 100:1, preferably from 1:1 to 10:1.

The reaction temperature is in general within the range from 100° to 280° C., preferably within the range from 120° to 220° C.

The reaction pressure is in general uncritical. The reaction is in general carried out within the range from 80 to 250 kPa, preferably under atmospheric pressure.

The choice of pH range is likewise uncritical and because of the amine used is in general above 7.

The reaction time is in general within the range from 1 to 20 h, preferably from 1 to 10 h.

Furthermore, the reaction mixture may include catalysts in amounts within the range from 0.01 to 10% by weight, based on the polymer used, to speed the reaction. Examples are tertiary amines such as tricyclohexylamine, substituted guanidines such as 1,1,3,3-tetramethylguanidine and 1,3-diphenylguanidine tetrasubstituted alkylammoniumcompounds such as trimethylstearylammonium chloride organic titanium compounds such as tetrapropoxytitanium and tetrabutoxytitanium organic tin compounds such as dibutyltin oxide and dibutyltin didodecanoate aromatic amines such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl imides such as N,N'-dicyclohexylcarbodiimide and also antimony trioxide, tin dioxide, sodium amide, sodium and potassium alkoxides such as sodium methoxide and potassium methoxide, ammonium chloride and ammonium iodide.

The poly(meth)acrylimide of the invention can be processed in a conventional manner, for example by injection molding, extrusion or sintering, to prepare moldings.

The poly(meth)acrylimides and moldings of the invention are advantageous over known polymers prepared from PMMA and amines in having a yellowness index of $\leq 2.0$ and a free carboxyl and/or anhydride group content of $\leq 0.40$ equivalent per kilogram of polymer.

The polymers of the invention can be used to prepare thermoplastically processible molding materials of high heat distortion resistance.

EXAMPLES

EXAMPLE 1 a) In a reaction vessel equipped with a packed column a mixture of 200 g of PMMA (comprising 99% by weight of MMA and 1% by weight of MA and having an average molecular weight ($M_w$) of 115,000 g/mol), 150 g of cyclohexylamine and 600 g of N-methylpyrrolidone was heated to the boil under nitrogen. The first methanol was withdrawn from the top of the column after about 1 h, and for the next 6 h the distillation was continued in such a way that the temperature at the top of the column was never higher than 70° C. 70 g of distillate were obtained. Subsequently the excess amine was distilled off and the polymethacrylimide was precipitated in methanol and then dried.

b) Run a) was repeated except for the sole difference that the methanol was distilled off not for 6 h but only for 3 h.

The results of the quality control tests are shown in Table 1.

EXAMPLES 2–4

By the procedure of Example 1 200 g of PMMA of the same composition as in Example 1 were reacted in each case with 1.5 mol of amine (see Table 2) at 190° C. in 600 g of N-methylpyrrolidone for 7 h and worked up as indicated above.

The results of the quality control tests are shown in Table 2.

COMPARATIVE EXAMPLE 1 (ANALOGOUSLY TO EP-B-234,726)

a) A solution of 200 g of PMMA of the same composition as in Example 1 was admixed with 150 g of cyclohexylamine in 600 g of 90/10 w/w toluene/methanol and heated to 230° C. After 4 h the mixture was cooled and the polymer formed was precipitated in methanol and then dried.

b) Run a) was repeated except for the sole difference that the reaction time was extended from 4 h to 8 h.

The results of the quality control tests are shown in Table 1.

COMPARATIVE EXAMPLE 2 (ANALOGOUSLY TO EP-B-234,726)

a) On a twin-screw extruder (ZSK-40) with corotating, intermeshing screws, 10 kg/h of PMMA (of the same composition as in Example 1) was continuously reacted at 270° C with 5 kg/h of cyclohexylamine. The reaction time was 0.1 h. Downstream of the reaction zone the polymer-melt was devolatilized on the same extruder and granulated.

b) Run a) was repeated except for the sole difference that the reaction time was extended from 0.[h to 0.2 h.

The results of the quality control tests are shown in Table 1.

The glass transition temperature $T_g$ of the polymers was determined by the DSC method (ASTM D 3418-82) on a DSC-30 instrument from Mettler.

The carboxyl and anhydride group content was determined titrimetrically. To this end 0.3 g of polymer was dissolved in 75 ml of 1:1 dichloromethane/methanol and admixed with an excess, based on the carboxyl and anhydride groups, of a measured volume of 0.1 N sodium hydroxide solution. Then excess base was titrated with 0.1 N hydrochloric acid to neutrality, the end point being determined potentiometrically.

The acid content was then determined from the difference, in equivalents, between the amount of base added and the amount of acid consumed, the acid value being corrected by subtracting the solvent blank (determined by carrying out the determination without polymer).

The acid number was then calculated as the acid content in equivalents per kilogram of imidizable polymer.

The $Y_i$ yellowness index was determined in accordance with DIN 6 167 on round disks (80 mm in diameter, 6 mm in thickness).

TABLE 1

IMIDIZATION WITH CYCLOHEXYLAMINE

| | Reaction time [h] | N content[1] [%] | Theoretical imide content[2] | Acid number [eq/kg] | $T_g$ [°C.] | $Y_i$ yellowness index |
|---|---|---|---|---|---|---|
| Example 1 | a) 3 | 4.9 | 82 | 0.19 | 193 | 1.3 |
| | b) 6 | 5.9 | 99 | 0.34 | 215 | 1.8 |
| Comparison 1 | a) 4 | 2.7 | 45 | 0.52 | 144 | 2.5 |
| | b) 8 | 5.0 | 84 | 0.82 | 179 | 3.2 |
| Comparison 2 | a) 0.1 | 3.0 | 50 | 1.13 | 165 | 2.8 |
| | b) 0.2 | 5.4 | 91 | 1.09 | — | 4.1 |

[1]Nitrogen content from elemental analysis

[2]Theoretical imide content calculated from $\frac{X\% \text{ of N (from elemental analysis)}}{6.0\% \text{ of N (theoretical maximum value)}} \times 100\%$

TABLE 2

IMIDIZATION WITH BENZYLAMINE, n-OCTYLAMINE AND n-DODECYLAMINE

| Example No. | Amine | N content[1] [%] | Theoretical imide content[2] [%] | Acid number [eq/kg] |
|---|---|---|---|---|
| 2 | benzylamine | 5.7 | 99 | 0.25 |
| 3 | n-octylamine | 4.9 | 94 | 0.32 |
| 4 | n-dodecylamine | 4.1 | 93 | 0.33 |

[1]Nitrogen content from elemental analysis
[2]Theoretical imide content calculated from
$\frac{X\% \text{ of N (from elemental analysis)}}{Y\% \text{ of N (theoretical maximum value)}} \times 100\%$

We claim:

1. A polymer consisting essentially of units of formula

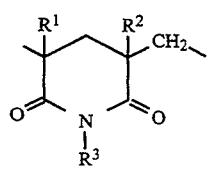

where
$R^1$ and $R^2$ are each hydrogen or methyl, and $R^3$ is $C_4$–$C_{18}$-alkyl, $C_5$–$C_8$-cycloalkyl, $C_6$–$C_{10}$-aryl or $C_6$–$C_{10}$-aryl -$C_1$–$C_4$alkyl, each of which except for the $C_4$–$C_{18}$-alkyl may be monosubstituted, disubstituted or trisubstituted by radicals selected from the group consisting of $C_1$–$C_4$-alkyl, $C_1$–$C_4$-alkoxy and halogen, and having a carboxyl and anhydride group content of equal to or less than 0.04 equivalent per kilogram of polymer and an inherent color (measured as yellowness index) of equal to or less than 20., said polymer being obtained by reacting a polymer based on $C_1$–$C_{20}$-alkyl esters of (meth)acrylic acid with a primary amine of the formula II $$R^3NH_2 \qquad \text{II}$$

and by removing the alcohol that forms during the reaction from the reaction mixture.

2. The polymer of claim 1 wherein the amine has a higher boiling point than the alcohol to be removed from the reaction mixture.

3. The polymer of claim 1 wherein the reacted primary amine is selected from the group consisting of n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, aniline, 2-, 3-, 4-methylaniline, 2-, 3-, 4-methoxyaniline, 2-, 3-, 4-chloroaniline, 2-, 3-, 4-bromoaniline, benzylamine, phenethylamine and phenylpropylamine.

4. The polymer of claim 2 wherein the reacted primary amine is cyclohexylamine.

5. The polymer of claim 1 wherein the reaction occurs in an aprotic polar solvent in a ratio of solvent to polymer of from 1:1 to 100:1.

6. The polymer of claim 5 wherein the ratio is from 1:1 to 10:1.

* * * * *